United States Patent
Van Winsen

[15] 3,694,000
[45] Sept. 26, 1972

[54] REAR AXLE SUSPENSION OF MOTOR VEHICLES

[72] Inventor: Friedrich H. Van Winsen, Kirchheim/Teck, Germany

[73] Assignee: Daimler-Benz Aktiengesellschaft, Stuttgart-Untertuerkheim, Germany

[22] Filed: April 17, 1970

[21] Appl. No.: 29,483

[30] Foreign Application Priority Data

April 23, 1969 Germany..........P 19 20 705.7

[52] U.S. Cl..................................280/124 R, 180/73
[51] Int. Cl...............................................B60g 3/00
[58] Field of Search..........280/124 R, 124 A; 180/73

[56] References Cited

UNITED STATES PATENTS 3,174,771  3/1965  Muller....................280/124 R
3,277,975  10/1966  Van Winsen........280/124 R X
3,573,882  4/1971  Van Winsen..........280/124 A

*Primary Examiner*—Philip Goodman
*Attorney*—Craig, Antonelli, & Hill

[57] ABSTRACT

A rear axle suspension of motor vehicles in which a wheel carrier is connected with the vehicle superstructure by way of a lower guide member and an upper guide member whereby the wheel carrier is extended forwardly, particularly in its lower part and the point of pivotal connection of the lower guide member at the wheel carrier is arranged at a relatively large distance forwardly of the vehicle transverse plane passing through the wheel center while the straight line connecting the joints of the lower guide member extends upwardly at a relatively steep incline.

47 Claims, 5 Drawing Figures

INVENTOR
FRIEDRICH H. VAN WINSEN

REAR AXLE SUSPENSION OF MOTOR VEHICLES

The present invention relates to a rear axle suspension of motor vehicles with a wheel carrier which is guided with respect to the vehicle superstructure as coupler by an upper and a lower guide member whereby the straight lines connecting the joints of each of the two guide members converge forwardly in the projection on the wheel plane.

With known rear axle suspensions of this type, in which the guide members are constructed as longitudinal guide members, possibly the lower guide member as inclined guide member with a pivot axis extending at an inclination to the longitudinal and transverse direction of the vehicle, the points of pivotal connection of the lower and of the upper guide member at the wheel carrier are disposed one above the other or nearly one above the other and approximately in the vertical vehicle transverse plane extending through the wheel center. The known wheel suspension of the prior art entail, however, as a rule, the disadvantage that they either without a starting equalization or require a relatively large structural expenditure. The absent starting equalization or compensation has, as a consequence, that the vehicles descend or move downwardly on the rear axle during the acceleration. Such a downward movement causes a deterioration of the driving properties and is additionally undesirable and troublesome during night driving by reason of the occurring blinding of other traffic participants and other users of the road.

It is the aim of the present invention above all to achieve with relatively simple means such a starting compensation or therebeyond, as this is desirable under certain circumstances, an overcompensation so that the vehicle rear end—instead of sinking or moving down as is customary heretofore—remains in its height position or possibly even lifts more or less during the acceleration. Furthermore, the vehicle rear section is not to lift during braking but also in this case is to remain at rest or by reason of the overcompensation is to move down more or less.

This can be achieved according to the present invention in that the wheel carrier, particularly in its lower part, is extended forwardly and the pivotal connecting point of the lower guide member and the wheel carrier is arranged at a distance from the vehicle transverse plane passing through the wheel center at the forwardly directed extension and the straight line through the connecting joints of the lower guide member is directed steeply upwardly.

The guide members may be directed from the wheel toward opposite sides, i.e., for example, the upper guide member toward the rear and the lower guide member toward the front or may also be directed toward the same side in that, for example, both guide members are directed toward the front whereby the terms "upper" and "lower" guide member are to be understood in the manner to be explained more fully hereinafter.

Preferably, the distance of the pivotal connecting point from the vehicle transverse plane passing through the wheel center is larger than the vertical distance of the pivotal connecting point from the horizontal plane passing through the wheel center when the wheel is in its normal rest position, or the distance of the connecting joints of the two guide members in the vehicle longitudinal direction is larger than in the vertical direction so that the wheel carrier extends more horizontally than vertically. Advantageously, the pivotal connecting point of the lower guide member at the wheel carrier is thereby located at least in proximity to the wheel circumference or appropriately outside of the wheel circumference in front thereof.

The following features and advantages can be achieved by the present invention:

As a result of the extension of the wheel carrier in the forward direction, the straight line connecting the joints of the wheel carrier, i.e., the connecting line between the two joints, which connect the wheel carrier with the upper and lower guide member, is displaced from its usual approximately vertical position evermore into a horizontal position, the further the lower joint point is displaced toward the front. In the boundary case, both of the joints may also be located in the same plane or an interchange may even occur in the sense that the ordinarily upper joint is disposed lower than the customarily lower joint. Consequently, the expressions "upper guide member" and "lower guide member" are to be understood only in an analogous manner.

If the wheel spring deflects, then primarily only the joint connecting the upper guide member with the wheel carrier and therewith the upper guide member partakes in this upwardly or downwardly directed spring movement whereas the joint connecting the lower guide member with the wheel carrier and the lower guide member have to carry out only a relatively small movement in the vertical direction and primarily only a movement in the vehicle longitudinal direction in order that the wheel carrier is able to follow the pivot arc of the upper guide member. The lower guide member can be dimensioned relatively short and can be accommodated thereby without difficulty below the rear seat of a passenger motor vehicle.

In order that a compensation is established both during the starting as well as during the braking, i.e., a downwardly movement of the vehicle rear section is prevented during the starting or acceleration or a lifting or upward movement of the vehicle rear section is prevented during the braking, according to a preferred embodiment of the present invention the upper and lower guide members are so designed and laid out that the point of intersection of the straight lines connecting the respective joints thereof, i.e., the straight connecting lines between the axis of the joint connecting a guide member with the wheel carrier and the axis of the joint connecting the same guide member with the vehicle superstructure, coincides with the point of intersection of the starting resultant engaging in the wheel center and of the brake force resultant engaging at the ground contact point of the wheel or is disposed in proximity to this last-mentioned point of intersection. However, since it is frequently desired that an overcompensation of the starting the brake moment is attained, the point of intersection of the aforementioned Joint-connecting straight lines may be located more or less above the point of intersection of the aforementioned resultants.

As a result of the more or less horizontal position of the wheel carrier and the shortening of the lower guide member, the wheel carrier may be constructed in the manner of a longitudinal or inclined guide member, for example, in such a manner that it includes two fork arms and each of the fork arms is connected with the vehicle superstructure by a lower guide member. also, in this case the wheel carrier may advantageously serve directly for the support of the wheel spring system.

Accordingly, it is an object of the present invention to provide a rear axle suspension of motor vehicles which avoids by simple means the aforementioned shortcomings and drawbacks.

Another object of the present invention resides in a rear axle suspension of motor vehicles which permits by simple means a starting compensation and possibly also a brake force compensation or even an overcompensation thereof.

A further object of the present invention resides in a rear axle suspension for motor vehicles which assures a predetermined position of the vehicle rear section during acceleration and deceleration of the vehicle notwithstanding the forces occurring under such driving conditions.

Still a further object of the present invention resides in a rear axle suspension for motor vehicles which not only achieves the aforementioned aims and objects in a simple manner, involving relatively simple parts but also assures ease of accommodation of the parts below the rear seats of a passenger motor vehicle.

These and other objects, features and advantages of the present invention will become more obvious from the following description when taken in connection with the accompanying drawing which shows, for purposes of illustration only, several embodiments in accordance with the present invention, and wherein.

Figure 1:
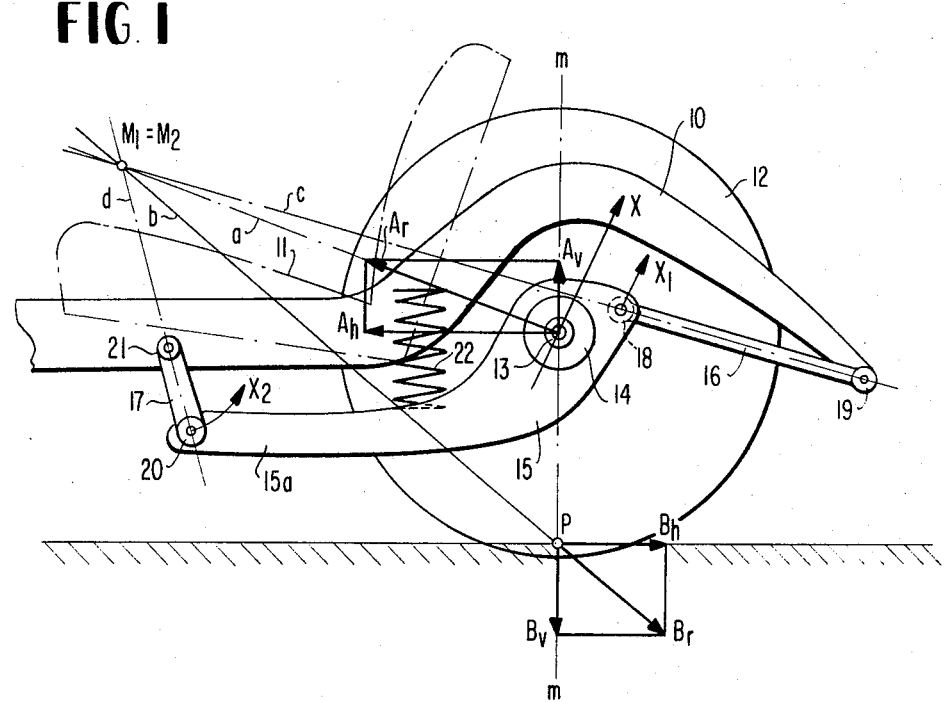
FIG. 1 is a schematic side view of a first embodiment of a rear axle suspension according to the present invention for starting and brake compensation.
Figure 2:
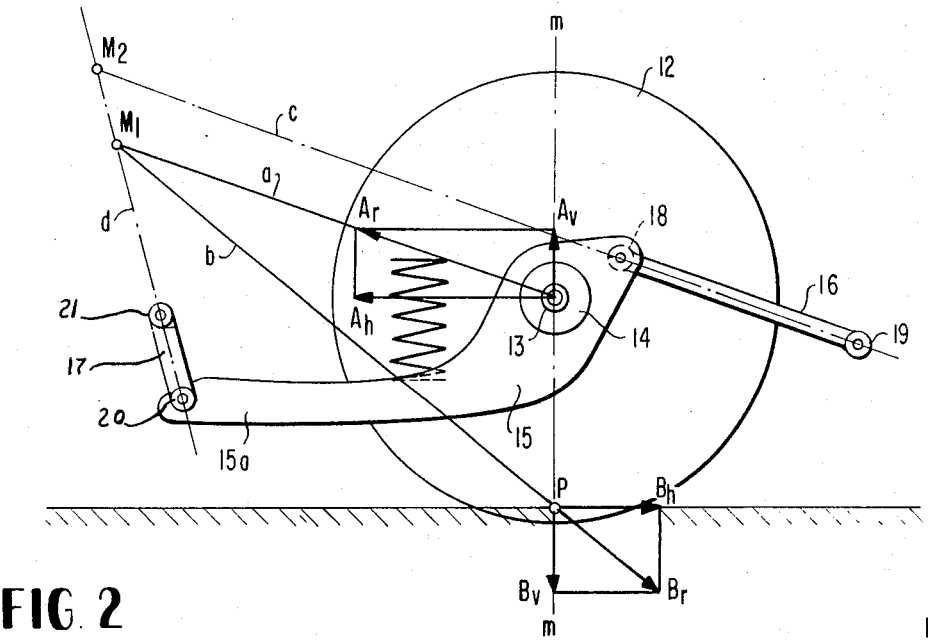
FIG. 2 is a schematic side view, similar to FIG. 1, of a modified embodiment of a rear axle suspension in accordance with the present invention providing a starting and brake overcompensation.

Referring now to the drawing wherein like reference numerals are used throughout the various views to designate like parts, and more particularly to FIGS. 1 and 2, reference numeral 10 designates in these figures the vehicle frame or another part of a conventional vehicle superstructure while reference numeral 11 designates a vehicle rear seat and reference numeral 12 a rear wheel. The wheel 12 may be driven in any suitable manner, for example, by a forwardly disposed driving engine by way of a rear differential gear and by way of a joint shaft and is supported, for example, in the usual manner in a bore 14 of the wheel carrier 15, by means of its wheel axle shaft 13 and by means of anti-friction roller bearings (not shown). The wheel carrier 15 is provided in its lower part with a forwardly directed extension 15a and is guided with respect to the vehicle superstructure by an "upper" guide member 16 as well as by a "lower" guide member 17 whereby the terms "upper" and "lower" are to be understood within the meaning explained above. The upper guide member 16 is thereby pivotally connected at the wheel carrier 15 by means of a joint 18 and at the vehicle superstructure 10 by means of a joint 19 and is directed primarily forwardly in the horizontal direction with a slight upward inclination whereas the lower guide member 17 is pivotally connected at the wheel carrier 15 by means of joint 20 and at the vehicle superstructure 10 by means of joint 21 and with a position directed steeply upwardly and forwardly is directed principally vertically. The lower guide member 17 is thereby constructed as short guide member whose joint 21 is disposed below the seat 11. A spring 22 for spring-supporting the wheel, for example, a coil spring, is supported with its lower end directly against the forward extension 15a of the wheel carrier 15.

The joint 18 of the upper rear guide member 16 which connects the same with the wheel carrier 15 is disposed approximately at the height of the wheel center and to the rear of the vertical vehicle transverse plane $m—m$ extending through the wheel center, i.e., through the axis of the wheel axle shaft 13, but in comparison to the joint 20 of the lower forward guide member 17 is located at a relatively smaller distance from this cross plane $m—m$ in such a manner that the vertical spacing between the joints 18 and 20 of the wheel carrier 15 is considerably smaller than the spacing of the two joints 18 and 20 in the vehicle longitudinal direction. The wheel carrier 15 constructed in the manner of a longitudinal guide member thus extends essentially horizontally whereby the guide members 16 and 17 are disposed far apart in the vehicle longitudinal direction.

During the starting or acceleration, a horizontal force $A_h$ and a vertical force $A_v$ occurs in the wheel center depending on the position of the center of gravity and of the load of the rear axle, which combine into a resultant $A_r$ whereby the force $A_v$ seeks to cause the wheel axle 13 and the vehicle superstructure 10 to approach one another, i.e., seeks to pull the vehicle superstructure 10 down toward the ground or road surface. In a similar manner, a horizontal force $B_h$ and a vertical force $B_v$ results at the contact point P between the wheel 12 and the road surface which seeks to force apart the vehicle superstructure 10 and the rear wheel 12 whereby the two forces produce a resultant force $B_r$. The direction of the straight lines $a$ of the starting resultant $A_r$ and $b$ of the brake resultant $B_r$ intersect in a point $M_1$.

In the embodiment according to FIG. 1, the two guide members 16 and 17 are so laid out that the joint-connecting straight line $c$ connecting the joints 18 and 19 of the upper guide member 16, i.e., which connects the axes of the joints 18 and 19, and the joint-connecting straight line $d$ of the lower guide member 17 which connects the axes of its joints 20 and 21, intersect in a point $M_2$ which coincides with the point $M_1$ as seen in side view of the vehicle. During a spring deflection of the wheel, in which the rear upper guide member 16 carries out a pivot movement in the direction of arrow $x_1$ and the forward lower guide member 17 carries out a pivot movement in the direction of arrow $x_2$, the instantaneous center of rotation $M_2$ of the wheel carrier 15, moving in the wheel center in the direction of arrow $x$, is located in the point of intersection $M_1$ of the two resultants $A_r$ and $B_r$ which has, as a consequence, that both during the starting or acceleration as also during the braking or deceleration a relative movement between wheel and vehicle superstructure in the sense of a decrease or of an increase in the mutual spacing is precluded. Thus, a 100 percent starting and brake compensation is achieved.

Since it is frequently desirable to achieve not only a 100 percent compensation but to achieve an overcompensation both during the starting as also during the braking, in the embodiment according to FIG. 2 the arrangement of the guide members 16 and 17 in relation to the starting resultant $A_r$ and the brake resultant $B_r$ is provided in such a manner that the point of intersection $M_2$ of the joint-connecting straight lines $c$ and $d$ is located above the point of intersection $M_1$ of the straight lines $a$ and $b$ of the starting resultant $A_r$ and of the brake resultant $B_r$. The arrangement may be further made in such a manner that during upward spring deflection of the wheel, points $M_1$ and $M_2$ coincide after a certain stroke, i.e., the starting and brake compensation therefore drops to a value of 100 percent.

Figure 3:
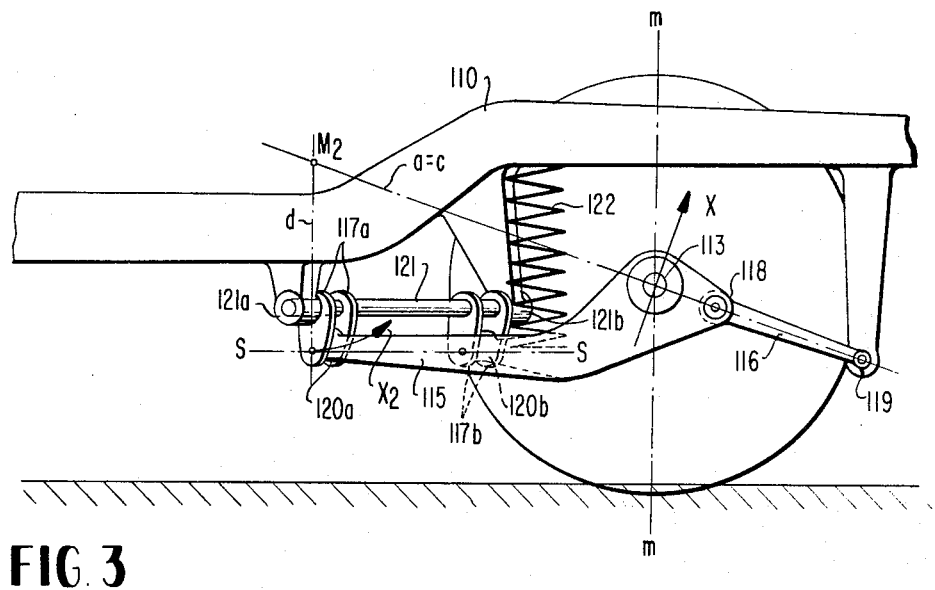
FIG. 3 is a schematic side view of a still further embodiment of a rear axle suspension in accordance with the present invention provided with a construction of the wheel carrier in the manner of an inclined guide member.
Figure 4:
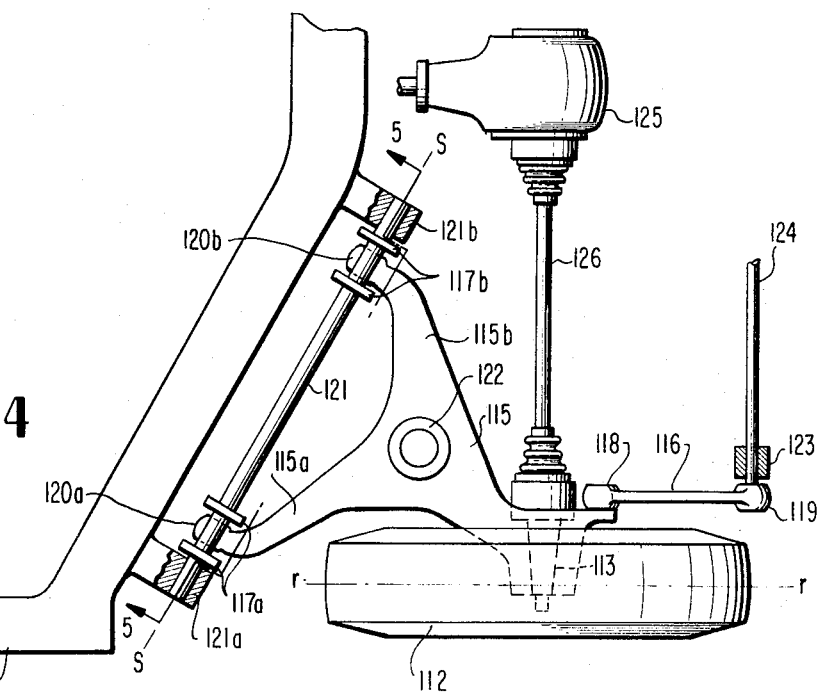
FIG. 4 is a plan view on the rear axle construction according to FIG. 3.
Figure 5:
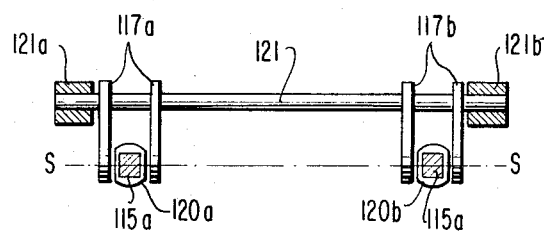
FIG. 5 is a cross-sectional view taken along line 5—5 of FIG. 4.

In the embodiment according to FIGS. 3 to 5, the same or corresponding parts as in FIGS. 1 and 2 are designated with corresponding reference numerals of the 100 series. The essential difference with respect to the first embodiment essentially consists in that the wheel carrier 115 of FIGS. 3 to 5 is constructed as inclined guide member with a pivot axis $s$—$s$ disposed at an inclination to the longitudinal and transverse direction of the vehicle. The wheel carrier 115 is constructed fork-shaped for that purpose. The two fork arms 115$a$ and 115$b$ are suspended by means of joints 120$a$ and 120$b$ at lower, forward guide members 117$a$ and 117$b$ which, in their turn, are rotatably supported in joint bearings 121$a$ and 121$b$ at mointing supports or brackets of the vehicle superstructure 110 by means of a common inclined axle or shaft 121 interconnecting the same in a Torsion-rigid manner. Possibly, the guide members 117$a$ and 117$b$ may also be pivotally supported on an axle 121 rigidly supported at the vehicle superstructure 110 in case of guide members 117$a$ and 116$b$ connected torsion-rigid in a different manner, for example, by means of a separate cross member. The fork arms 115$a$ The 115$b$ forming the forward extensions are furthermore extended forwardly so far that the lower or forward guide members 117$a$ are directed vertically or upright in the illustrated normal position. The upper, rear guide member 116 is located with its joint 118 below the wheel center 113 and is securely connected in the joint 119, for example, with a stabilizer 124 supported at the vehicle superstructure in lateral bearings 123 and connecting the two wheel suspensions. the point of intersection $M_2$ forming the instantaneous center of rotation of the wheel carrier 115, may, in relation to the vertical longitudinal center plane $r$—$r$ of the wheel 112, again coincide or nearly coincide with the point of intersection $M_1$ of the straight lines $a$ and $b$ of the resultants $A_r$ and $B_r$ (not shown in FIG. 3) or may be disposed above this point of intersection $M_1$ corresponding to FIG. 2.

FIG. 4 further illustrates a differential gear 125 by way of which the wheel axle shafts 113 are driven by means of the joint shafts 126.

The arrangement may also be made in such a manner that a compensation or overcompensation is achieved for only one of the two moments consisting of starting and brake moment, for example, also in such a manner that a compensation is produced for one of the two moments while an overcompensation is produced for the other moment.

As already explained, instead of a rearwardly directed upper guide member, an upper guide member extending forwardly from the wheel carrier may also be provided which, as seen in side view of the vehicle, is arranged in the direction of a corresponding joint-connecting straight line $c$. Also, the joint point 20 or the guide member 17 may be displaced forwardly so far that the guide member 17, instead of being directed forwardly at an inclination to the vehicle superstructure, is directed rearwardly at an inclination to the vehicle superstructure, i.e., the joint 21 is located therefore farther back than the joint 20. The corresponding is also applicable in an analogous manner to the construction according to FIGS. 3 to 5 or to types of constructions of wheel suspensions within the scope of the present invention.

Consequently, while I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A rear axle suspension of motor vehicles comprising: vehicle superstructure, wheel carrier means, upper and lower guide means pivotally connected to said vehicle superstructure and said wheel carrier means, the points of pivotal connection between the upper guide means and the vehicle superstructure and wheel carrier means defining a first joint-connecting straight line, the points of pivotal connection between the lower guide means and the vehicle superstructure and wheel carrier means defining a second joint connecting straight line, said first and second lines converging in the forward direction in the projection of the wheel plane, said wheel carrier means having a forward extension, the point of pivotal connection of one of the guide means with the wheel carrier means being arranged in the forward extension at a distance from a vehicle transverse plane passing through the wheel center, the one of the said first and second lines associated with the one guide means extending steeply upwardly, the distance between the pivotal connection point of the one guide means at the wheel carrier means and said vehicle transverse plane being larger than the vertical spacing of said pivotal connecting point from a horizontal plane passing through the wheel center, the distance between the two joints connecting the wheel carrier means with the two wheel guide means being larger in the vehicle longitudinal direction than in the vehicle vertical direction, the point of pivotal connection of the one guide means at the wheel carrier means being located outside of the wheel circumference in front thereof.

2. A rear axle suspension according to claim 1, characterized in that the wheel carrier means is extended forwardly in its lower part.

3. A rear axle suspension according to claim 2, characterized in that the upper and lower guide means are directed in opposite directions from the wheel.

4. A rear axle suspension of motor vehicles comprising: vehicle superstructure, wheel carrier means, upper and lower guide means pivotally connected to said vehicle superstructure and said wheel carrier means, the points of pivotal connection between the upper guide means and the vehicle superstructure and wheel carrier means defining a first joint-connecting straight line, the points of pivotal connection between the lower guide means and the vehicle superstructure and wheel carrier means defining a second joint connecting straight line, said first and second lines converging in the forward direction in the projection of the wheel plane, said wheel carrier means having a forward extension, the point of pivotal connection of one of the guide means with the wheel carrier means being arranged in the forward extension at a distance from a vehicle transverse plane passing through the wheel center, the one of the said first and second lines associated with the one guide means extending steeply upwardly, the distance between the pivotal connection point of the one guide means at the wheel carrier means and said vehicle transverse plane being larger than the vertical spacing of said pivotal connecting point from a horizontal plane passing through the wheel center, the distance between the two joints connecting the wheel carrier means with the two wheel guide means being larger in the vehicle longitudinal direction than in the vehicle vertical direction, the point of pivotal connection connecting the wheel carrier means with the other guide means being disposed to the rear of said vehicle transverse plane.

5. A rear axle suspension according to claim 4, characterized in that said one guide means is the lower guide means and said other guide means is the upper guide means.

6. A rear axle suspension according to claim 4, characterized in that said last-mentioned point of pivotal connection is located in the normal position of the wheel at least approximately in a horizontal plane extending through the wheel center.

7. A rear axle suspension according to claim 4, characterized in that the point of intersection of the straight lines connecting the joints of the upper and lower guide means, respectively, is located at least in proximity to the point of intersection of the starting force resultant engaging in the wheel center and of the braking force resultant engaging at the point of contact of the wheel with the ground.

8. A rear axle suspension according to claim 7, characterized in that the first-mentioned point of intersection is disposed above said second-mentioned point of intersection for purposes of achieving an overcompensation of the starting and brake moment.

9. A rear axle suspension of motor vehicles comprising: vehicle superstructure, wheel carrier means, upper and lower guide means pivotally connected to said vehicle superstructure and said wheel carrier means, the points of pivotal connection between the upper guide means and the vehicle superstructure and wheel carrier means defining a first joint-connecting straight line, the points of pivotal connection between the lower guide means and the vehicle superstructure and wheel carrier means defining a second joint connecting straight line, said first and second lines converging in the forward direction in the projection of the wheel plane, said wheel carrier means having a forward extension, the point of pivotal connection of one of the guide means with the wheel carrier means being arranged in the forward extension at a distance from a vehicle transverse plane passing through the wheel center, the one of the said first and second lines associated with the one guide means extending steeply upwardly, the distance of the two joints connecting the wheel carrier means with the two wheel guide means being larger in the vehicle longitudinal direction than in the vertical direction.

10. A rear axle suspension of motor vehicles comprising: vehicle superstructure, wheel carrier means, upper and lower guide means pivotally connected to said vehicle superstructure and said wheel carrier means, the points of pivotal connection between the upper guide means and the vehicle superstructure and wheel carrier means defining a first joint-connecting straight line, the points of pivotal connection between the lower guide means and the vehicle superstructure and wheel carrier means defining a second joint connecting straight line, said first and second lines converging in the forward direction in the projection of the wheel plane, said wheel carrier means having a forward extension, the point of pivotal connection of one of the guide means with the wheel carrier means being arranged in the forward extension at a distance from a vehicle transverse plane passing through the wheel center, the one of the said first and second lines associated with the one guide means extending steeply upwardly, the one guide means being arranged at an inclination to the horizontal at an angle of more than 45°.

11. A rear axle suspension according to claim 10, characterized in that the one guide means is pivotally connected at the vehicle superstructure below a vehicle rear seat.

12. A rear axle suspension according to claim 10, characterized in that the wheel carrier means is extended forwardly in its lower part.

13. A rear axle suspension according to claim 10, characterized in that the upper and lower guide means are directed in opposite directions from the wheel.

14. A rear axle suspension according to claim 10, characterized in that with the wheel in its normal position, the distance of the point of pivotal connection of the one guide means at the wheel carrier means from said vehicle transverse plane is larger than the vertical spacing of said pivotal connecting point from a horizontal plane passing through the wheel center.

15. A rear axle suspension according to claim 14, characterized in that the distance of the two joints connecting the wheel carrier means with the two wheel guide means is larger in the vehicle longitudinal direction than in the vertical direction.

16. A rear axle suspension of motor vehicles comprising: vehicle superstructure, wheel carrier means, upper and lower guide means pivotally connected to said vehicle superstructure and said wheel carrier means, the points of pivotal connection between the upper guide means and the vehicle superstructure and wheel carrier means defining a first joint-connecting straight line, the points of pivotal connection between the lower guide means and the vehicle superstructure and wheel carrier means defining a second joint connecting straight line, said first and second lines converging in the forward direction in the projection of the wheel plane, said wheel carrier means having a forward extension, the point of pivotal connection of one of the guide means with the wheel carrier means being arranged in the forward extension at a distance from a vehicle transverse plane passing through the wheel center, the one of the said first and second lines associated with the one guide means extending steeply upwardly, the one guide means having a relatively short length in relation to the length of the other guide means.

17. A rear axle suspension of motor vehicles comprising: vehicle superstructure, wheel carrier means, upper and lower guide means pivotally connected to said vehicle superstructure and said wheel carrier means, the points of pivotal connection between the upper guide means and the vehicle superstructure and wheel carrier means defining a first joint-connecting straight line, the points of pivotal connection between the lower guide means and the vehicle superstructure and wheel carrier means defining a second joint connecting straight line, said first and second lines converging in the forward direction in the projection of the wheel plane, said wheel carrier means having a forward extension, the point of pivotal connection of one of the guide means with the wheel carrier means being arranged in the forward extension at a distance from a vehicle transverse plane passing through the wheel center, the one of the said first and second lines associated with the one guide means extending steeply upwardly, the one guide means being of relatively short construction in relation to the length of the wheel carrier means.

18. A rear axle suspension of motor vehicles comprising: vehicle superstructure, wheel carrier means, upper and lower guide means pivotally connected to said vehicle superstructure and said wheel carrier means, the points of pivotal connection between the upper guide means and the vehicle superstructure and wheel carrier means defining a first joint-connecting straight line, the points of pivotal connection between the lower guide means and the vehicle superstructure and wheel carrier means defining a second joint connecting straight line, said first and second lines converging in the forward direction in the projection of the wheel plane, said wheel carrier means having a forward extension, the point of pivotal connection of one of the guide means with the wheel carrier means being arranged in the forward extension at a distance from a vehicle transverse plane passing through the wheel center, the one of the said first and second lines associated with the one guide means extending steeply upwardly, the point of pivotal connection connecting the wheel carrier means with the other guide means being disposed to the rear of said vehicle transverse plane.

19. A rear axle suspension according to claim 18, characterized in that said last-mentioned point of pivotal connection is located in the normal position of the wheel at least approximately in a horizontal plane extending through the wheel center.

20. An axle suspension for supporting a wheel and axle assembly on a motor vehicle comprising: vehicle superstructure, wheel carrier means, a forwardly arranged guide means which is pivotally attached at one point to the vehicle supersturcture and at another point to the wheel carrier means, and a rearwardly arranged guide means which is pivotally attached at one point to the vehicle superstructure and at another point to the wheel carrier means, the two points of pivotal connection of the forwardly arranged guide means defining a first centerline and the two points of pivotal connection of the rearwardly arranged guide means defining a second centerline, said first and second centerlines intersecting at a point located forwardly of the vertical line of symmetry of the wheel, said first centerline intersecting a horizontally extending road surface over which the wheel is travelling in front of the vertical plane of symmetry of the wheel, and said second centerline intersecting said road surface to the rear of said vertical plane.

21. An axle suspension according to claim 20, characterized in that the distance between the points of connection between the wheel carrier means and the respective guide means is greater in the vehicle longitudinal direction than in the vehicle vertical direction.

22. An axle suspension according to claim 21, characterized in that the point of pivotal connection of one of the guide means at the wheel carrier means is located in proximity to the wheel circumference.

23. An axle suspension according to claim 21, characterized in that the point of pivotal connection between the rearwardly arranged guide means and the wheel carrier means is located with the wheel in its normal position below a horizontal plane passing through the wheel center and to the rear of the wheel center.

24. An axle suspension according to claim 20, characterized in that one of the guide means is arranged at an inclination to the horizontal at an angle of more than 45°.

25. An axle suspension according to claim 24, characterized in that the one guide means is pivotally connected at the vehicle superstructure below a vehicle rear seat.

26. An axle suspension according to claim 20, characterized in that the point of pivotal connection between the rearwardly arranged guide means and the wheel carrier means is located with the wheel in its normal position below a horizontal plane passing through the wheel center and to the rear of the wheel center.

27. An axle suspension according to claim 26, characterized in that said one guide means is the upper guide means and said other guide means is the lower guide means.

28. An axle suspension according to claim 20, characterized in that the point of intersection of said first and second centerlines is located at least in proximity to the point of intersection of the starting force resultant engaging in the wheel center and of the braking force resultant engaging at the point of contact of the wheel with the ground.

29. An axle suspension according to claim 28, characterized in that said second-mentioned point of intersection substantially coincides with said first-mentioned point of intersection.

30. An axle suspension according to claim 20, characterized in that the wheel carrier means is constructed as an inclined guide member.

31. An axle suspension according to claim 30, characterized in that the wheel carrier means includes two fork arms, and in that each fork arm is connected with the vehicle superstructure by a forward guide member forming part of the forwardly arranged guide means.

32. An axle suspension according to claim 31, characterized in that the two forward guide members are suspended at the vehicle superstructure connected in a torsion-rigid manner.

33. An axle suspension according to claim 32, characterized in that a common shaft interconnects said two forward guide members in a torsion-rigid manner.

34. An axle suspension according to claim 32, characterized in that the wheel carrier means serves for the support of the wheel spring system.

35. An axle suspension according to claim 34, characterized in that said wheel carrier means is disposed essentially horizontally.

36. An axle suspension according to claim 20, characterized in that the point of pivotal connection of the forwardly arranged guide means at the wheel carrier means is located in proximity to the wheel circumference.

37. An axle suspension according to claim 36, characterized in that the point of pivotal connection of the forwardly arranged guide means at the wheel carrier means is located outside of the wheel circumference in front thereof.

38. An axle suspension according to claim 20, characterized in that the point of intersection of the first and second center lines is located at least in proximity to the point of intersection of the starting resultant force engaging in the wheel center and of the braking force resultant engaging at the point of contact of the wheel with the ground.

39. An axle suspension according to claim 38, characterized in that said second-mentioned point of intersection substantially coincides with said first-mentioned point of intersection.

40. An axle suspension according to claim 38, characterized in that the first-mentioned point of intersection is disposed above said second-mentioned point of intersection for purposes of achieving an overcompensation of the starting and braking moment.

41. An axle suspension according to claim 20, characterized in that the wheel carrier means includes two fork arms, and in that each fork arm is connected with the vehicle superstructure by a lower guide forward member forming part of the forwardly arranged guide means.

42. An axle suspension according to claim 41, characterized in that said wheel carrier means is constructed as a longitudinal guide member.

43. An axle suspension according to claim 41, characterized in that said wheel carrier means is constructed as an inclined guide member.

44. An axle suspension according to claim 41, characterized in that the two means guide members are suspended at the vehicle superstructure connected in a torsion-rigid manner.

45. An axle suspension according to claim 44, characterized in that a common shaft interconnects said two forward guide members in a torsion-rigid manner.

46. An axle suspension according to claim 20, characterized in that said wheel carrier means is disposed essentially horizontally.

47. An axle suspension according to claim 46, characterized in that the wheel carrier means serves for the support of the wheel spring system.

* * * * *